United States Patent
Lee

(10) Patent No.: US 11,279,024 B2
(45) Date of Patent: Mar. 22, 2022

(54) HAND OF ROBOT AND CONTROL METHOD THEREOF

(71) Applicant: LG ELECTRONICS INC., Seoul (KR)

(72) Inventor: Wonhee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 16/580,923

(22) Filed: Sep. 24, 2019

(65) Prior Publication Data
US 2020/0016747 A1    Jan. 16, 2020

(30) Foreign Application Priority Data

Aug. 1, 2019  (KR) .......................... 10-2019-0094075

(51) Int. Cl.
*B25J 9/16*  (2006.01)
*B25J 9/00*  (2006.01)

(52) U.S. Cl.
CPC ........... *B25J 9/1612* (2013.01); *B25J 9/0015* (2013.01); *B25J 9/1653* (2013.01)

(58) Field of Classification Search
CPC ..................................... B25J 9/16; B25J 9/00
See application file for complete search history.

(56) References Cited

U.S. PATENT DOCUMENTS

| | | | | |
|---|---|---|---|---|
| 5,184,319 | A | * | 2/1993 | Kramer .................. G06F 3/011 345/156 |
| 9,016,742 | B2 | * | 4/2015 | Nammoto ............ B25J 15/0028 294/106 |
| 10,888,487 | B1 | * | 1/2021 | Rogers ................ A41D 19/0044 |
| 2006/0129248 | A1 | | 6/2006 | Stark |
| 2009/0285664 | A1 | | 11/2009 | Kim et al. |
| 2010/0010670 | A1 | * | 1/2010 | Matsukuma ........... B25J 9/1612 700/245 |
| 2010/0176615 | A1 | * | 7/2010 | Okuda ..................... A61F 2/583 294/106 |
| 2010/0249676 | A1 | * | 9/2010 | Kawakami .............. A61F 5/013 601/40 |

(Continued)

FOREIGN PATENT DOCUMENTS

| | | |
|---|---|---|
| CN | 205835384 U | 12/2016 |
| KR | 10-2011-0080922 A | 7/2011 |

(Continued)

*Primary Examiner* — Kira Nguyen
(74) *Attorney, Agent, or Firm* — Birch, Stewart, Kolasch & Birch, LLP

(57) ABSTRACT

A hand of a robot includes: a hand main body including a palm; a plurality of fingers connected to the hand main body; a first spreader disposed inside the hand main body; a second spreader positioned between the palm and the first spreader and disposed in parallel to the first spreader; a plurality of stretching wires connected to any one of the first spreader and the second spreader, and configured to pull the fingers to cause the fingers to be stretched; a plurality of bending wires connected the other one of the first spreader and the second spreader, and configured to pull the fingers to cause the fingers to be bent; a driving mechanism configured to rotate and/or shift the first spreader and the second spreader; and a rotation detection sensor provided on at least one of the first spreader or the second spreader.

9 Claims, 12 Drawing Sheets

(56) References Cited

U.S. PATENT DOCUMENTS

| | | | |
|---|---|---|---|
| 2010/0259057 A1* | 10/2010 | Madhani | B25J 15/0009 |
| | | | 294/106 |
| 2011/0040408 A1* | 2/2011 | De La Rosa Tames | ...................... |
| | | | B25J 9/1045 |
| | | | 700/258 |
| 2011/0163561 A1 | 7/2011 | Kim et al. | |
| 2013/0242455 A1* | 9/2013 | Prahlad | B25J 15/00 |
| | | | 361/234 |
| 2014/0035306 A1* | 2/2014 | Garcia | B25J 15/0009 |
| | | | 294/213 |
| 2016/0052130 A1* | 2/2016 | Ekas | B25J 15/0009 |
| | | | 74/490.04 |
| 2016/0325437 A1 | 11/2016 | Laville et al. | |
| 2017/0049583 A1* | 2/2017 | Belter | A61F 2/583 |

FOREIGN PATENT DOCUMENTS

| | | |
|---|---|---|
| KR | 10-1479232 B1 | 1/2015 |
| KR | 10-2016-0120732 A | 10/2016 |

* cited by examiner

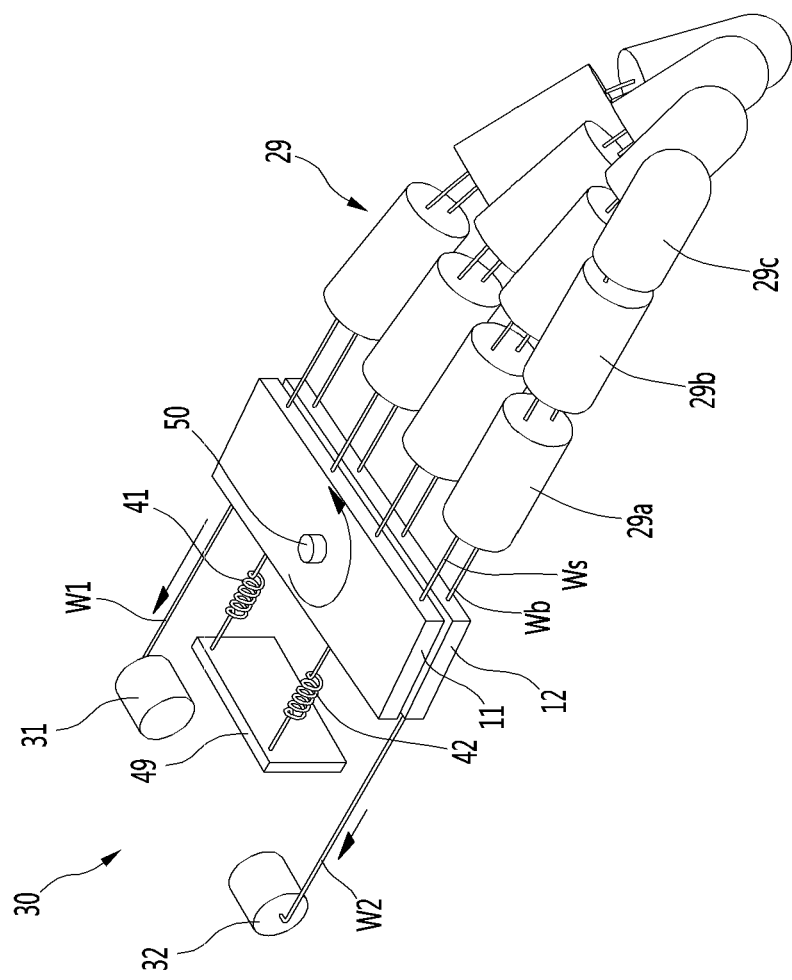

HAND OF ROBOT AND CONTROL METHOD THEREOF

CROSS-REFERENCE TO RELATED APPLICATION

The present application claims priority under 35 U.S.C. 119 and 35 U.S.C. 365 to Korean Patent Application No. 10-2019-0094075, filed on Aug. 1, 2019, which is hereby incorporated by reference in its entirety.

BACKGROUND

The present disclosure relates to a hand of a robot including a plurality of fingers, and a control method thereof.

Mechanical devices performing motions like human motions by using electrical or magnetic actions are generally referred to as robots. In recent years, robots are utilized in various fields with the enhancement of control technology, and for example, may include surgical robots, housekeeper robots, service robots, aerospace remote control robots, hazardous material processing robots, and the like.

A hand of such a robot can perform a motion close to the motion of human hands by using an electric/mechanical mechanism.

The human hand is an extremely complex part of the human body. The hand includes several fingers connected to the periphery of palm through joints. In addition, each finger has several phalanges connected to one another through joints. Each joint may move by muscles. Various joints of the hand enable a person to grip objects of various shapes.

However, such a grip function is one of the most difficult functions that a robotized system can generate, and many independent actuators are required to guarantee the capability of gripping various objects. That is, hands of related-art robots have the problem of extreme complexity.

CITED LITERATURES

Patent Literatures

KR 10-2011-0080922A (published on Jul. 13, 2011)
KR 10-2016-0120732A (published on Oct. 18, 2016)

SUMMARY

An object of the present disclosure is to provide a hand of a robot which can easily detect a shape of a gripped object, and a control method thereof.

Another object of the present disclosure is to provide a hand of a robot which has a simple configuration, can be manufactured at a minimized cost, and can be easily controlled, and a control method thereof.

A hand of a robot according to an embodiment of the present disclosure may include: a hand main body including a palm; a plurality of fingers connected to the hand main body; a first spreader disposed inside the hand main body; a second spreader positioned between the palm and the first spreader and disposed in parallel to the first spreader; a plurality of stretching wires connected to any one of the first spreader and the second spreader, and configured to pull the fingers to cause the fingers to be stretched; a plurality of bending wires connected to the other one of the first spreader and the second spreader, and configured to pull the fingers to cause the fingers to be bent; a driving mechanism configured to rotate and/or shift the first spreader and the second spreader; and a rotation detection sensor provided on at least one of the first spreader or the second spreader.

The driving mechanism may include: a first driving wire connected to a point that is eccentric to one side with respect to a longitudinal direction of one spreader of the first spreader and the second spreader; a first motor configured to wind the first driving wire; a second driving wire connected to a point that is eccentric to the other side with respect to the longitudinal direction of the one spreader; a second motor configured to wind the second driving wire; a first elastic member connected to a point that is eccentric to one side with respect to a longitudinal direction of the other spreader of the first spreader and the second spreader; and a second elastic member connected to a point that is eccentric to the other side with respect to the longitudinal direction of the other spreader.

The driving mechanism may include: a first driving wire connected to a point that is eccentric to one side with respect to a longitudinal direction of one spreader of the first spreader and the second spreader; a first motor configured to wind the first driving wire; a first elastic member connected to a point that is eccentric to the other side with respect to the longitudinal direction of the one spreader; a second driving wire connected to a point that is eccentric to one side with respect to a longitudinal direction of the other spreader of the first spreader and the second spreader; a second motor configured to wind the second driving wire; and a second elastic member connected to a point that is eccentric to the other side with respect to the longitudinal direction of the other spreader.

The driving mechanism may include: a first driving wire connected to a point that is eccentric to one side with respect to a longitudinal direction of one spreader of the first spreader and the second spreader; a first motor configured to wind the first driving wire; a second driving wire connected to a point that is eccentric to the other side with respect to the longitudinal direction of the one spreader; a second motor configured to wind the second driving wire; a third driving wire connected to a point that is eccentric to one side with respect to a longitudinal direction of the other spreader of the first spreader and the second spreader; a third motor configured to wind the third driving wire; a fourth driving wire connected to a point that is eccentric to the other side with respect to the longitudinal direction of the other spreader; and a fourth motor configured to wind the fourth driving wire.

The driving mechanism may include: a driving wire connected to a middle point with respect to a longitudinal direction of one spreader of the first spreader and the second spreader; a motor configured to wind the driving wire; and an elastic member connected to a middle point with respect to a longitudinal direction of the other spreader of the first spreader and the second spreader.

The driving mechanism may include: a first driving wire connected to a middle point with respect to a longitudinal direction of one spreader of the first spreader and the second spreader; a first motor configured to wind the first driving wire; a second driving wire connected to a middle point with respect to a longitudinal direction of the other spreader of the first spreader and the second spreader; and a second motor configured to wind the second driving wire.

The rotation detection sensor may be positioned at a middle point with respect to a longitudinal direction of the first spreader or the second spreader.

The first spreader and the second spreader may be spaced apart from the palm.

Some of the plurality of stretching wires may be connected to a point that is eccentric to one side with respect to a longitudinal direction of the first spreader, and others may be connected to a point that is eccentric to the other side.

Some of the plurality of bending wires may be connected to a point that is eccentric to one side with respect to a longitudinal direction of the second spreader, and others may be connected to a point that is eccentric to the other side.

The hand of the robot according to an embodiment of the present disclosure may further include: a controller configured to control the driving mechanism; a simulation unit configured to receive a control signal from the controller and to calculate an estimated operation of the first spreader and the second spreader; and an object determination unit configured to, when a difference between the estimated operation and a real operation detected by the rotation detection sensor falls out of a set range, calculate a shape of a gripped object, and to transmit a feedback signal to the controller.

The hand of the robot according to an embodiment of the present disclosure may further include an output unit configured to, when the difference between the estimated operation and the real operation falls within the set range, output a notification that the object is not detectable.

A control method of a hand of a robot according to an embodiment of the present disclosure may include the steps of: transmitting a control signal to a driving mechanism configured to rotate and/or shift the spreader; calculating an estimated operation of the spreader which is estimated according to the control signal; detecting, by a rotation detection sensor, a real operation of the spreader; when a difference between the real operation and the estimated operation falls out of a set range, calculating a shape of an object gripped by the hand of the robot; and feedback-controlling the driving mechanism according to the shape of the object.

The control method of the hand of the robot according to an embodiment of the present disclosure may further include a step of, when the difference between the real operation and the estimated operation falls within the set range, outputting a notification that the object is not detectable to an output unit.

BRIEF DESCRIPTION OF THE DRAWINGS

FIGS. 6A and 6B are views to explain an action of the hand of the robot according to the first embodiment of the present disclosure;

DETAILED DESCRIPTION OF THE EMBODIMENTS

Figure 1:
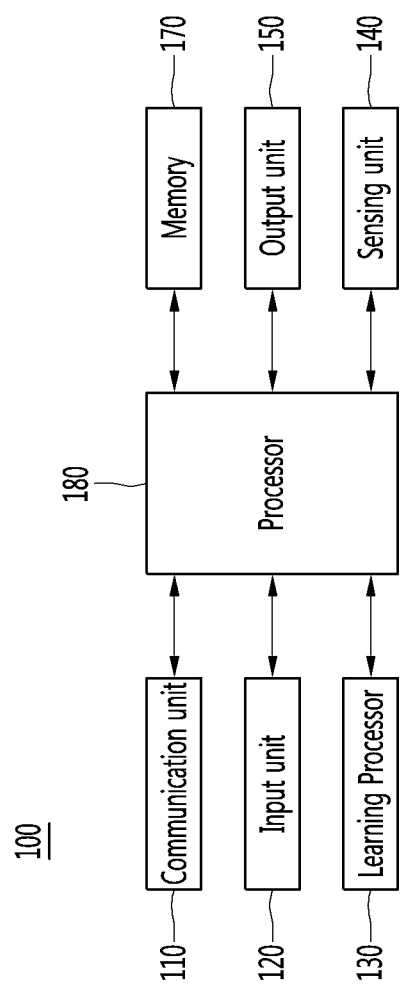
FIG. 1 illustrates an AI device 100 including a robot according to an embodiment of the present disclosure.

Hereinafter, specific embodiments of the present disclosure will be described in detail with reference to the drawings.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
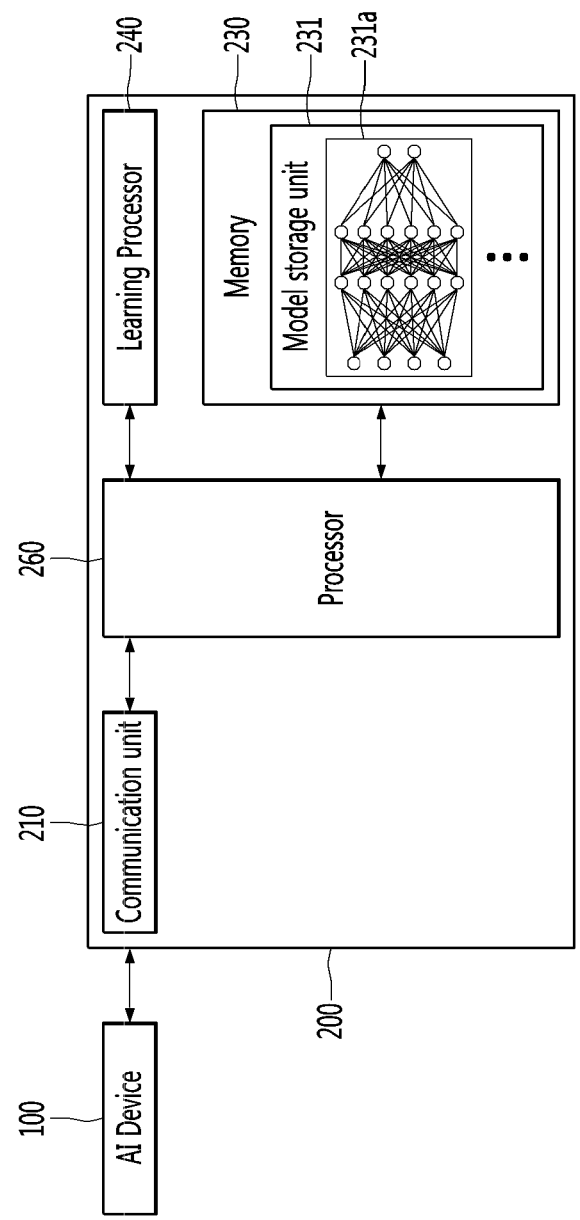
FIG. 2 illustrates an AI server 200 connected to a robot according to an embodiment of the present disclosure.

FIG. 2 illustrates an AI server 200 connected to a robot according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
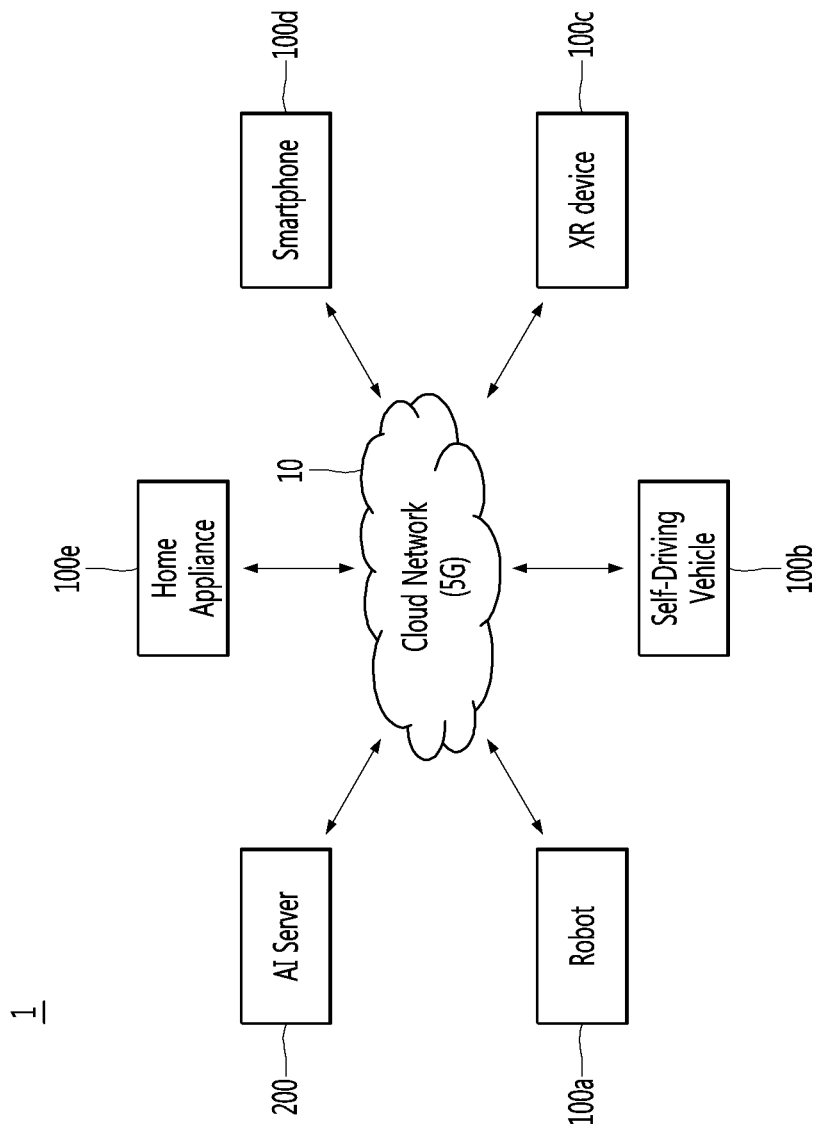
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
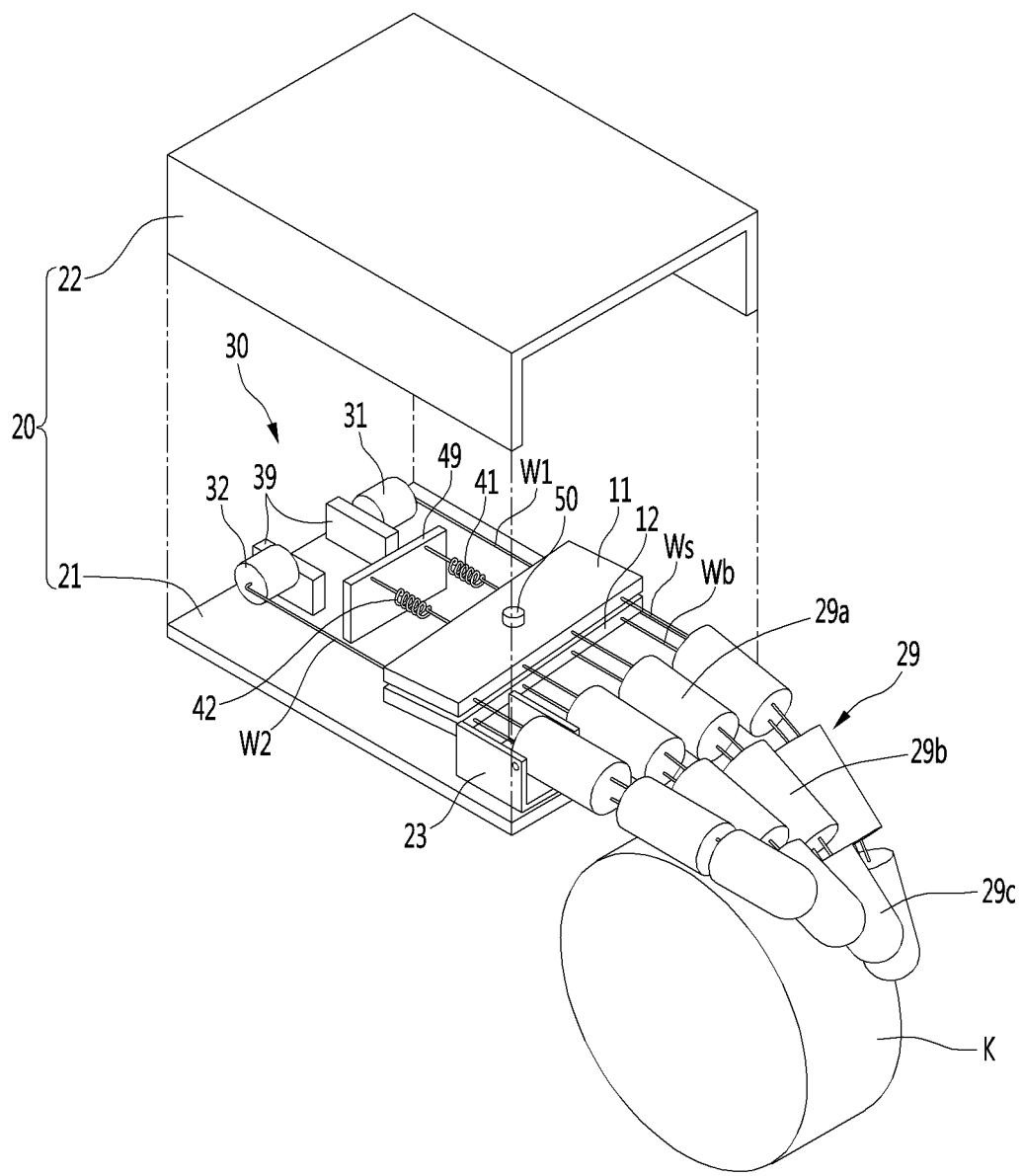
FIG. 4 is a schematic view of a hand of a robot according to a first embodiment of the present disclosure.
Figure 5:
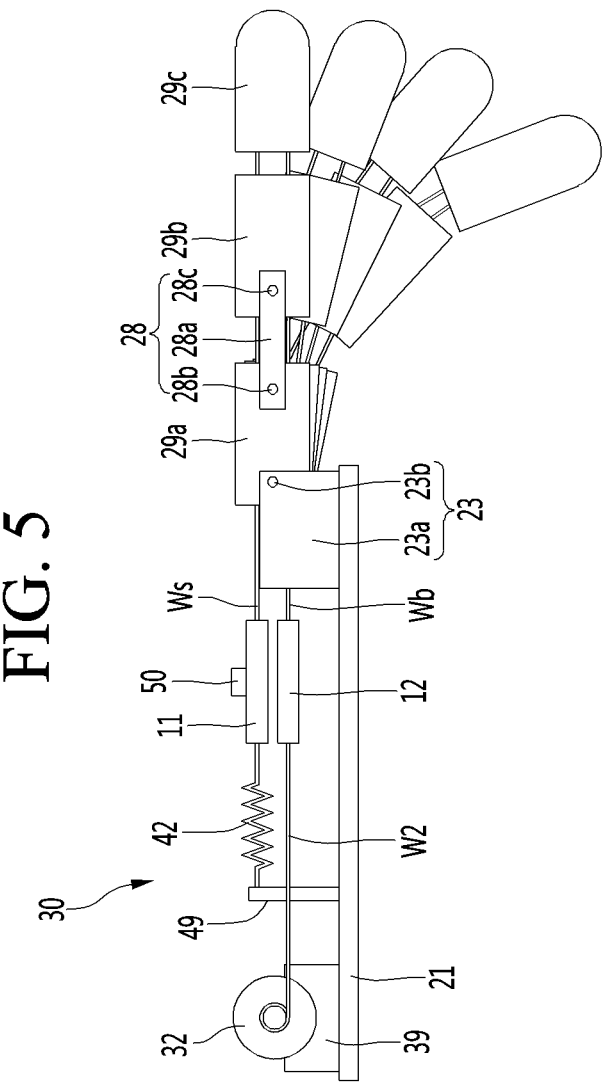
FIG. 5 is a side view of the hand of the robot shown in FIG. 4.

FIG. 4 is a schematic view of a hand of a robot according to a first embodiment of the present disclosure, and FIG. 5 is a side view of the hand of the robot shown in FIG. 4.

The hand of the robot according to an embodiment of the present disclosure may be an element that is included in the robot 100a described above.

The hand of the robot may include a hand main body 20, and a plurality of finger 29 connected to the hand main body 20.

The hand main body 20 may include a palm 21 and a back of the hand 22. The hand main body 20 may have an inner space formed therein, and the inner space may be positioned between the palm 21 and the back of the hand 22.

The plurality of fingers 29 may be connected to the hand main body 20. The fingers 29 may be bent or stretched with respect to the hand main body 20, and may grip an object K. For reference, thumb is omitted from FIGS. 4 and 5.

A finger connector 23 may be provided in the hand main body 20 to have the fingers 29 rotatably connected thereto.

More specifically, the finger connector 23 may include one pair of fixing portions 23a fixed to the hand main body and spaced apart from each other in parallel, and a rotation shaft 23b connecting the one pair of fixing portions 23a. Some of the fingers 29 may be positioned between the one pair of fixing portions 23a to be connected to the rotation shaft 23b. Accordingly, the fingers 29 may rotate about the rotation shaft 23b.

The number of finger connectors 23 may be the same as the number of fingers 29. However, only one finger connector 23 is illustrated in FIGS. 4 and 5 for the sake of brevity of the drawings.

Each finger may include a plurality of phalanges 29a, 29b, 29c connected to one another through joints 28. For example, the finger 29 may include a first phalanx 29a connected to the hand main body 20, more specifically, to the finger connector 23, a second phalanx 29b connected to the first phalanx 29a through the joint 28, and a third phalanx 29c connected to the second phalanx 29b through the joint 28.

Each phalanx 29a, 29b, 29c may have a hollow container shape, and a stretching wire WS and a bending wire WB, which will be described below, may pass through and connected to the inside of each phalanx 29a, 29b, 29c.

Each joint 28 may include one pair of bars 28a formed longways in a longitudinal direction of the phalanx 29a, 29b, 29c, and spaced apart from each other in parallel, a first joint shaft 28b connected to the one pair of bars 28a and connected to one phalanx, and a second joint shaft 28c connected to the one pair of bars 28a and connected to another phalanx.

For the sake of brevity of the drawings, only one joint 28 is illustrated in FIGS. 4 and 5.

The hand of the robot may include a first spreader 11, a second spreader 12, a driving mechanism 30 to rotate and/or shift the first spreader 11 and the second spreader 12, a plurality of stretching wires Ws connected to any one of the first spreader 11 and the second spreader 12, and a plurality of bending wires Wb connected to the other one of the first spreader and the second spreader.

The first spreader 11 and the second spreader 12 may be disposed inside the hand main body 20.

The first spreader 11 and the second spreader 12 may be formed longways in one direction (for example, a horizontal direction). The first spreader 11 and the second spreader 12 may be disposed in parallel to each other.

The second spreader 12 may be positioned between the palm 21 and the first spreader 11. That is, the second spreader 12 may be positioned under the first spreader 11 with reference to the directions shown in FIGS. 4 and 5.

The first spreader 11 and the second spreader 12 may be spaced apart from the palm 21 and the back of the hand 22. That is, the first spreader 11 and the second spreader 12 may be supported by wires W1, W2, Ws, Wb, and elastic members 41, 42, and may be suspended inside the hand body 20. Accordingly, the first spreader 11 and the second spreader 12 may be freely shifted and rotated inside the hand main body 20.

The driving mechanism 30 according to the present embodiment may include one pair of motors 31, 32, one pair of driving wires W1, W2, and one pair of elastic members 41, 42.

The motors 31, 32 may be disposed inside the hand main body 20. The motors 31, 32 may be positioned opposite the fingers 29 with reference to the first spreader 11 and the second spreader 12.

Motor fixing portions 39 may be provided inside the hand main body 20 to fix the motors 31, 32. The motor fixing portions 39 may be fixed to at least one of the palm 21 or the back of the hand 22.

The driving wires W1, W2 may connect the motors 31, 32 and the spreaders 11, 12. The driving wires W1, W2 may be wound by the motors 31, 32 to pull the spreaders 11, 12.

The elastic members 41, 42 may be connected to the spreaders 11, 12, and may apply elastic force to the spreaders 11, 12.

The spreaders 11, 12 may be shifted and/or rotated by the driving wires W1, W2, and as a result, the elastic members 41, 42 may be deformed. Accordingly, when the driving wires W1, W2 are unwound, the spreaders 11, 12 may be shifted and/or rotated to the original position by the elastic force of the elastic members 41, 42.

An elastic member fixing portion 49 may be provided inside the hand main body 20 to have one end of each of the elastic members 41, 42 fixed thereto. The elastic member fixing portion 49 may be fixed to at least one of the palm 21 or the back of the hand 22.

The one pair of motors 31, 32 may include a first motor 31 and a second motor 32, and the one pair of driving wires W1, W2 may include a first driving wire W1 connected to the first motor 31 and a second driving wire W2 connected to the second motor 32. In addition, the one pair of elastic members 41, 42 may include a first elastic member 41 and a second elastic member 42.

One pair of driving members eccentric to both sides with respect to the longitudinal direction of the spreaders 11, 12 may be connected to each spreader 11, 12. The driving members may refer to the driving wires W1, W2, or the elastic members 41, 42.

For example, the first elastic member 41 and the second elastic member 42 may be connected to the first spreader 11, and the first driving wire W1 and the second driving wire W2 may be connected to the second spreader 12.

In another example, the first driving wire W1 and the second driving wire W2 may be connected to the first spreader 11, and the first elastic member 41 and the second elastic member 42 may be connected to the second spreader 12.

In still another example, the first driving wire W1 and the first elastic member 41 may be connected to the first spreader 11, and the second driving wire W1 and the second elastic member 42 may be connected to the second spreader 12.

Hereinafter, as shown in FIGS. 4 and 5, a case in which the first elastic member 41 and the second elastic member 42 are connected to the first spreader 11, and the first driving wire W1 and the second driving wire W2 are connected to the second spreader 12 will be described by way of an example. Those skilled in the art will easily understand the other examples described above and another example.

The first driving wire W1 may be connected to a point that is eccentric to one side with respect to the longitudinal direction of the second spreader 12, and the second driving wire W2 may be connected to a point that is eccentric to the other side. For example, the first driving wire W1 and the second driving wire W2 may be connected to both ends of the second spreader 12.

The first elastic member 41 may be connected to a point that is eccentric to one side with respect to the longitudinal direction of the first spreader 11, and the second elastic member 42 may be connected to a point that is eccentric to the other side. The first elastic member 41 and the second elastic member 42 may be connected to both ends of the first spreader 11.

The stretching wires Ws and the bending wires Wb connected to the fingers 29 may be separate wires which are separated from one another. Alternatively, the stretching wires Ws and the bending wires Wb may be different parts of a single wire that are connected to one another.

The respective numbers of the stretching wires Ws and the bending wires Wb may correspond to the number of fingers 29.

The stretching wires Ws may be connected to any one of the first spreader 11 and the second spreader 12, and may pull the fingers 29 to cause the fingers 29 to be stretched. The bending wires Wb may be connected to the other one of the first spreader 11 and the second spreader 12, and may pull the fingers 29 to cause the fingers 29 to be bent. A configuration for driving fingers of a hand of a robot by wires is well-known technology (for example, KR 10-2011-0080922A or KR 10-2016-0120732A), and thus a detailed description thereof is omitted.

Hereinafter, a case in which the stretching wires Ws are connected to the first spreader 11, and the bending wires Wb are connected to the second spreader 12 will be described by way of an example.

Some of the plurality of stretching wires Ws may be connected to a point that is eccentric to one side with respect to the longitudinal direction of the first spreader 11, and others may be connected to a point that is eccentric tow the other side.

Some of the plurality of bending wires Wb may be connected to a point that is eccentric to one side with respect to the longitudinal direction of the second spreader 12, and others may be connected to a point that is eccentric to the other side.

When the motors 31, 32 wind the driving wires W1, W2, the driving wires W1, W2 may pull the second spreader 12, and the bending wires Wb connected to the second spreader 12 may pull the fingers 29 and may bend the respective fingers 29.

When the motors 31, 32 unwind the driving wires W1, W2, the first spreader 11 may be pulled by the recovering force of the elastic members 41, 42, and the stretching wires Ws connected to the first spreader 11 may pull the fingers 29 and may stretch the respective fingers 29.

The hand of the robot may include a rotation detection sensor 50 provided on at least one of the first spreader 11 or the second spreader 12.

The rotation detection sensor 50 may detect shift and rotation of the spreaders 11, 12. The rotation detection sensor 50 may include at least one of an acceleration sensor, a magnetic field sensor, and a gyro sensor.

A controller of the hand of the robot may calculate an operation of each finger 29 according to a result of detecting by the rotation detection sensor 40. That is, the controller may easily grasp a state of each finger 29 by using the rotation detection sensor 50. Accordingly, states and operations of all of the plurality of fingers 29 can be detected by a smaller number of rotation detection sensors 50 than the number of fingers 29.

In addition, the controller may perform feedback control for the hand of the robot according to a detection value of the rotation detection sensor 50, and accordingly, the hand of the robot can be precisely controlled.

The rotation detection sensor 50 may be positioned at a center with respect to the longitudinal direction of the spreaders 11, 12. Accordingly, the rotation detection sensor 50 can easily detect rotation directions and rotation angles of the spreaders 11, 12.

Figure 6B:
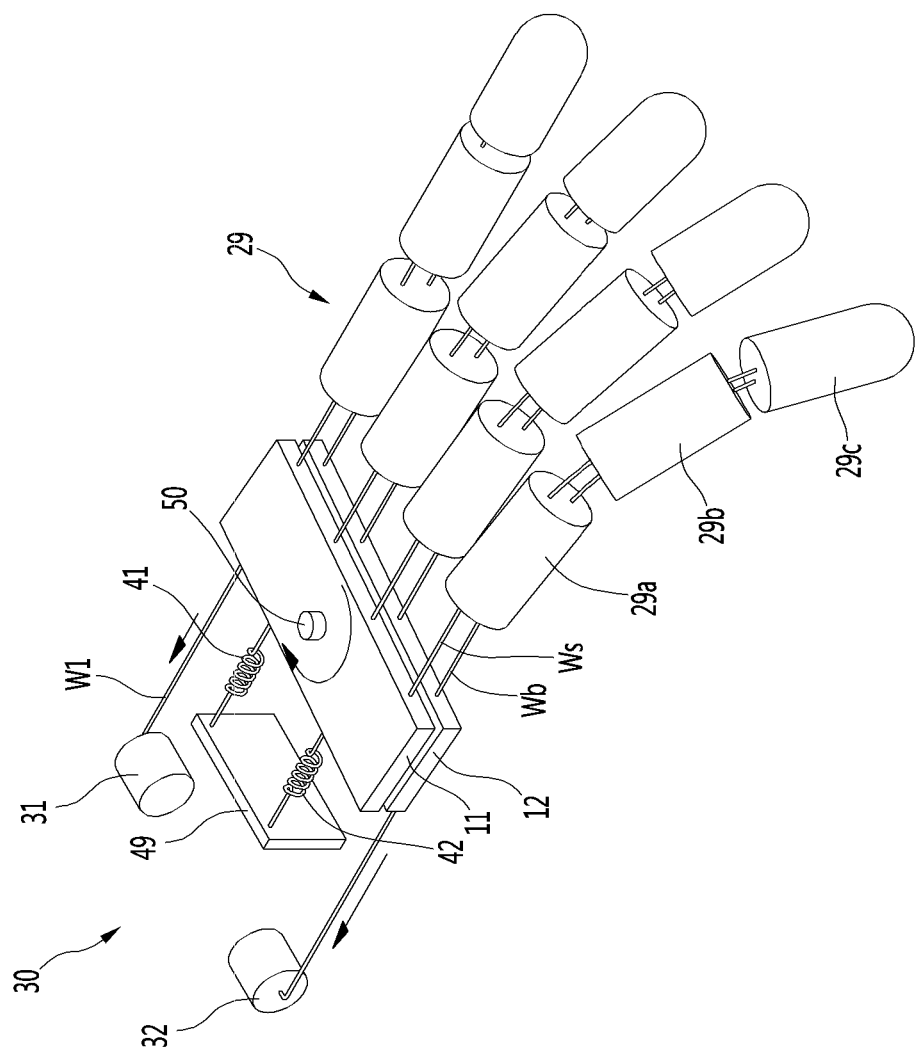

FIGS. 6A and 6B are views to explain an action of the hand of the robot according to the first embodiment of the present disclosure.

FIG. 6A illustrate a state in which the spreaders 11, 12 rotate in one direction, and FIG. 6B illustrates a state in which the spreaders 11, 12 rotate in the other direction. However, the first spreader and the second spreader may rotate in different directions, or may rotate at different angles in the same direction.

As shown in FIG. 6A, when the first motor 31 and the second motor 32 wind the first driving wire W1 and the second driving wires W2, and the first driving wire W1 is more wound, the second spreader 12 may be shifted toward the motors 31, 32, and simultaneously, may rotate in one direction (for example, the counter clockwise direction).

Alternatively, when the first motor 31 winds the first driving wire W1 and the second motor 32 unwinds the second driving wire W2, the second spreader 12 may rotate in one direction (for example, the counter clockwise direction).

That is, one side of the second spreader 12 may be relatively more pulled toward the motors 31, 32, and the other side of the second spreader 12 may be relatively less pulled toward the motors 31, 32. Accordingly, fingers that are pulled by the bending wires Wb connected to a point close to an end of the one side of the second spreader 12 may be more bent. For example, the index finger out of the plurality of fingers 29 may be most bent, followed by the middle finger, the ring finger, and the little finger.

As shown in FIG. 6B, when the first motor 31 and the second motor 32 wind the first driving wire W1 and the second driving wire W2, and the second driving wire W2 is more wound, the second spreader 12 may be shifted toward the motors 31, 32, and simultaneously, may rotate in THE OTHER direction (for example, the clockwise direction).

Alternatively, when the first motor 31 unwinds the first driving wire W1 and the second motor 32 winds the second driving wire W2, the second spreader 12 may rotate in the other direction (for example, the clockwise direction).

That is, the other side of the second spreader 12 may be relatively more pulled toward the motors 31, 32, and the one side of the second spreader 12 may be relatively less pulled toward the motors 31, 32. Accordingly, fingers that are pulled by the bending wires Wb connected to a point close to an end of the other side of the second spreader 12 may be more bent. For example, the little finger out of the plurality of fingers 29 may be most bent, followed by the ring finger, the middle finger, and the index finger.

Since there is a difference in degrees of bending of the fingers 29, there may be a difference in degrees of pulling respective points of the first spreader 11 by the stretching wires Ws. Accordingly, the first spreader 11 may rotate, and any one of the first elastic member 41 and the second elastic member 42 may be deformed more than the other one. Due to the difference in the deformation, all of the stretching wires Ws, the bending wires Wb, and the driving wires W1, W2 can be kept uniformly taut.

Accordingly, there is an advantage that all of the plurality of fingers 29 can be controlled by a smaller number of motors 31, 32 than the number of fingers 29.

Figure 7:
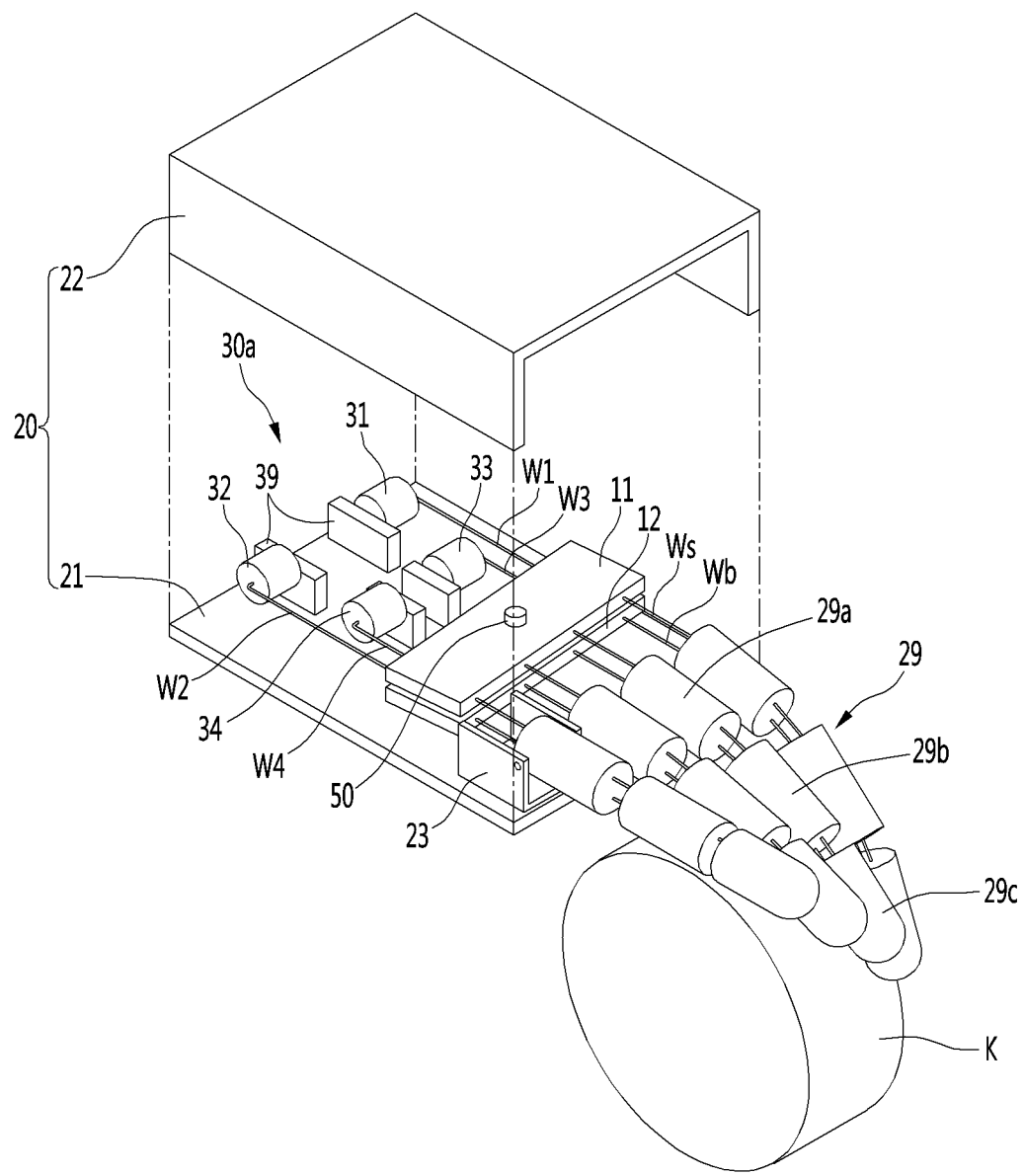
FIG. 7 is a schematic view of a hand of a robot according to a second embodiment of the present disclosure.

FIG. 7 is a schematic view of a hand of a robot according to a second embodiment of the present disclosure.

The hand of the robot according to the present embodiment is the same as that of the first embodiment described above, except for a configuration of a driving mechanism 30a, and thus a redundant explanation is omitted and the difference will be highlighted.

The driving mechanism 30a according to the present embodiment may include a first motor 31, a first driving wire W1 connected to the first motor 31, a second motor 32, a second driving wire connected to the second motor 32, a third motor 33, a third driving wire W3 connected to the third motor 33, a fourth motor 34, and a fourth driving wire W4 connected to the fourth motor 34.

Hereinafter, a case in which the first driving wire W1 and the second driving wire W2 are connected to the second spreader 12, and the third driving wire W3 and the fourth driving wire W4 are connected to the first spreader 11 will be described by way of an example.

The first driving wire W1 may be connected to a point that is eccentric to one side with respect to the longitudinal direction of the second spreader 12, and the second driving wire W2 may be connected to a point that is eccentric to the other side. For example, the first driving wire W1 and the second driving wire W2 may be connected to both ends of the second spreader 12.

The third driving wire W3 may be connected to a point that is eccentric to one side with respect to the longitudinal direction of the first spreader 11, and the fourth driving wire W4 may be connected to a point that is eccentric to the other side. For example, the third driving wire W3 and the fourth driving wire W4 may be connected to both ends of the first spreader 11.

When any one of the first driving wire W1 and the third driving wire W3 is wound, the other one may be unwound. When any one of the second driving wire W2 and the fourth driving wire W4 is wound, the other one may be unwound. Accordingly, all of the stretching wires Ws, the bending wires Wb, and the driving wires W1, W2, W3, W4 can be kept uniformly taut.

Figure 8:
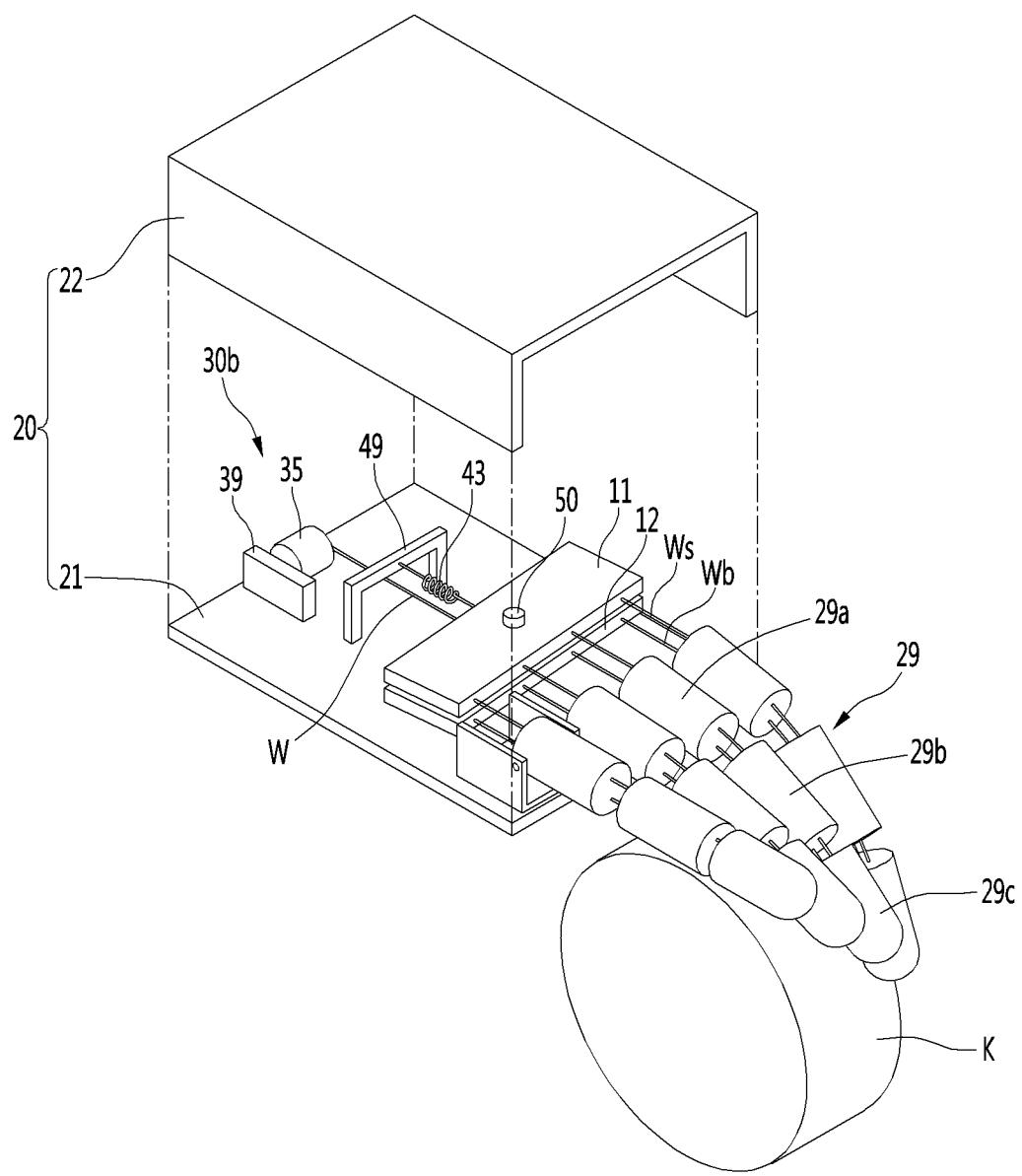
FIG. 8 is a schematic view of a hand of a robot according to a third embodiment of the present disclosure.

FIG. 8 is a schematic view of a hand of a robot according to a third embodiment of the present disclosure.

The hand of the robot according to the present embodiment is the same as that of the first embodiment described above, except for a driving mechanism 30b, and thus a redundant explanation is omitted and the difference will be highlighted.

The driving mechanism 30b according to the present embodiment may include a motor 35, a driving wire W connected to the motor 35, and an elastic member 43.

The driving wire W may be connected to any one of the first spreader 11 and the second spreader 12, and the elastic member 43 may be connected to the other one.

Hereinafter, a case in which the elastic member 43 is connected to the first spreader 11 and the driving wire W is connected to the second spreader 12 will be explained by way of an example.

The driving wire W my be connected to a middle point with respect to the longitudinal direction of the second spreader 12. The elastic member 43 may be connected to a middle point with respect to the longitudinal direction of the first spreader 11.

When the motor 35 winds the driving wire W, the fingers 29 may grip the object K and degrees of bending of the fingers 29 may vary according to a shape of the object K.

Degrees of the stretching wires Ws and the bending wires Wb connected to the fingers 29 being stretched may vary according to the degrees of bending of the fingers 29, and the first spreader 11 and the second spreader 12 may be shifted and/or rotated.

Accordingly, the hand of the robot according to the present embodiment may have difficulty in actively controlling bending of each finger 29 in a state in which there does not exist the object K. However, when there exists the object K, there is an advantage that the object K can be effectively gripped only with the single motor 35.

In addition, the rotation detection sensor 50 may detect shift and/or rotation of the spreaders 11, 12. The shift and/or rotation of the spreaders 11, 12 may be determined according to the shape of the object K, and thus the controller of the hand of the robot can easily recognize the shape of the gripped object K.

Figure 9:
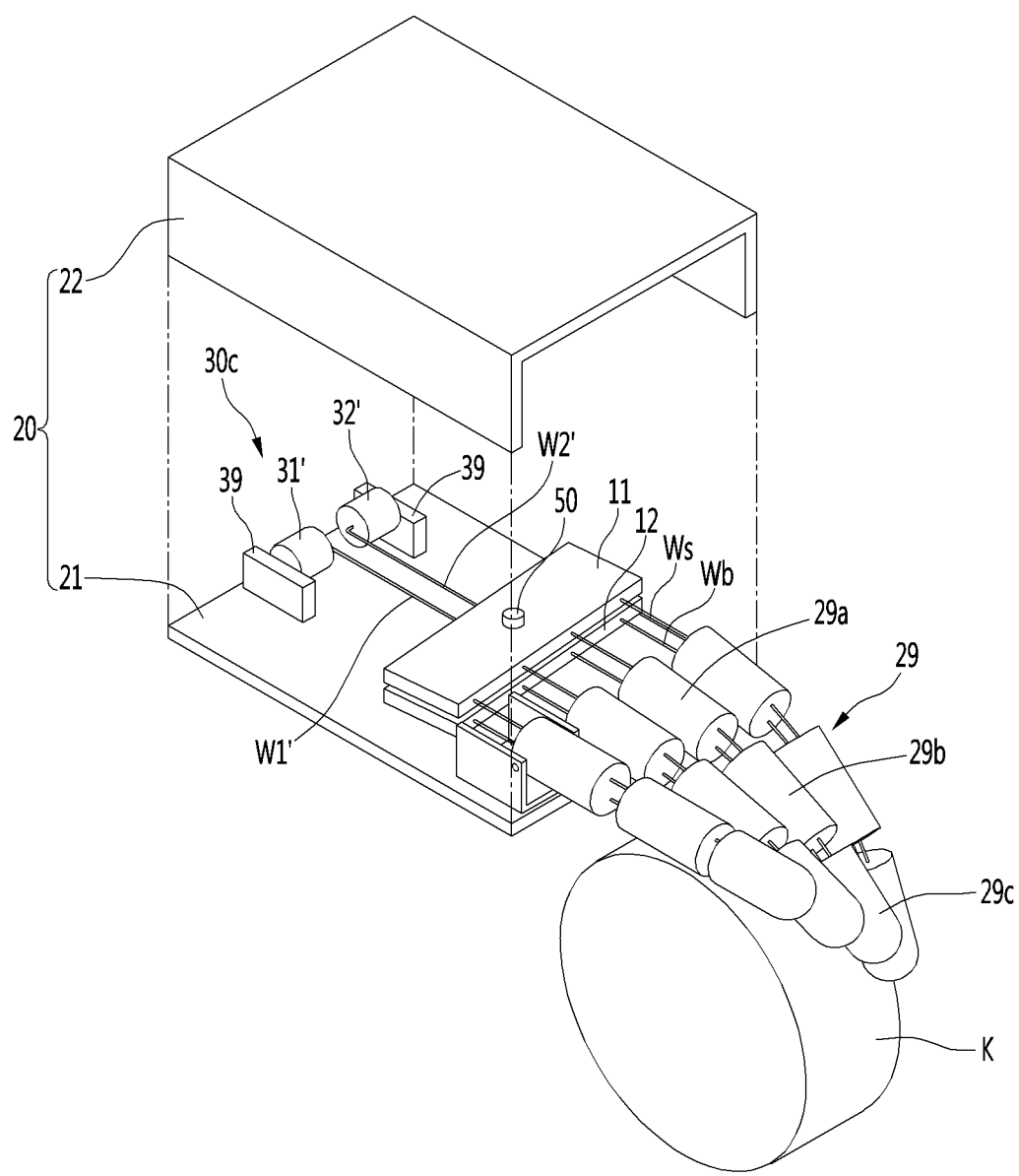
FIG. 9 is a schematic view of a hand of a robot according to a fourth embodiment of the present disclosure.

FIG. 9 is a schematic view of a hand of a robot according to a fourth embodiment of the present disclosure.

The hand of the robot according to the present embodiment is the same as that of the third embodiment described above, except for a driving mechanism 30c, and thus a redundant explanation is omitted and the difference will be highlighted.

The driving mechanism 30c according to the present embodiment may include a first motor 31', a first driving wire W1' connected to the first motor 31', a second motor 32', and a second driving wire W2' connected to the second motor 32'.

Hereinafter, a case in which the first driving wire W1' is connected to the second spreader 12 and the second driving wire W2' is connected to the first spreader 11 will be described by way of an example.

The first driving wire W1' may be connected to a middle point with respect to the longitudinal direction of the second spreader 12. The second driving wire W2' may be connected to a middle point with respect to the longitudinal direction of the first spreader 11.

When any one of the first driving wire W1' and the second driving wire W2' is wound, the other one may be unwound. Accordingly, all of the stretching wires Ws, the bending wires Wb, and the driving wires W1, W2 can be kept uniformly taut.

Figure 10:
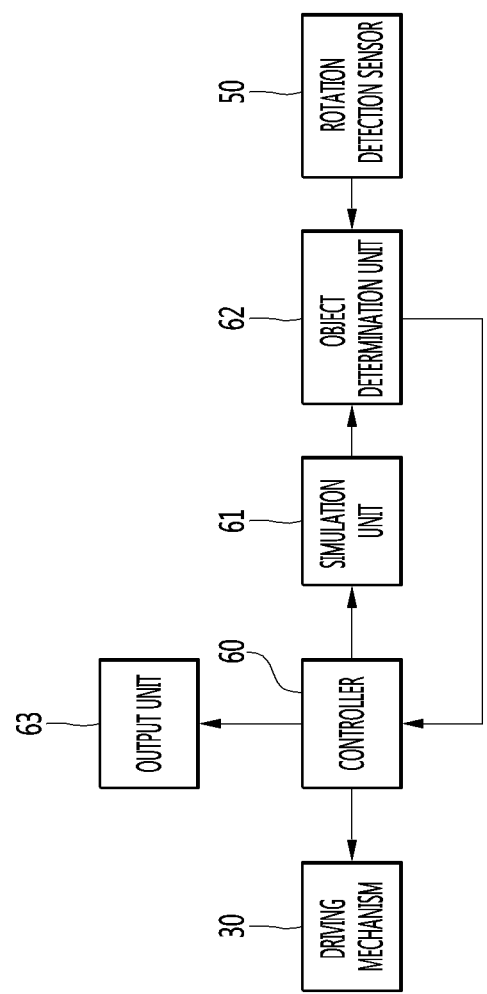
FIG. 10 is a control block diagram of the hand of the robot according to an embodiment of the present disclosure.

FIG. 10 is a control block diagram of the hand of the robot according to an embodiment of the present disclosure.

The hand of the robot according to an embodiment of the present disclosure may further include a controller 60, a simulation unit 61, and an object determination unit 62.

The controller 60 may control the driving mechanism 30. The controller 60 may transmit a control signal to the driving mechanism 30, and the driving mechanism 30 may be driven according to the control signal.

More specifically, in the first embodiment (see FIG. 4) described above, the controller 60 may control the first motor 31 and the second motor 32.

In the second embodiment (see FIG. 7), the controller 60 may control the first motor 31, the second motor 32, the third motor 33, and the fourth motor 34.

In the third embodiment (see FIG. 8), the controller 60 may control the motor 35.

In the fourth embodiment (see FIG. 9), the controller 60 may control the first motor 31' and the second motor 32'.

The simulation unit 61 may receive the control signal from the controller 60. That is, the controller 60 may transmit the same control signal to the driving mechanism 30 and the simulation unit 61, respectively.

The simulation unit 61 may calculate an estimated operation of the first spreader 11 and the second spreader 12 according to the control signal. More specifically, when the driving mechanism 30 is driven according to the control signal, the simulation unit 61 may simulate rotation and/or shift estimated for the first spreader 11 and the second spreader 12. The estimated operation may be calculated on the assumption that each finger 29 is freely moved.

The object determination unit 62 may receive a real operation of the spreaders 11, 12 detected at the rotation detection sensor 50. In addition, the object determination unit 62 may receive the estimated operation of the spreaders 11, 12 calculated at the simulation unit 61.

As described above, the rotation detection sensor 50 may be provided on at least one of the first spreader 11 or the second spreader 12. Since operations of the first spreader 11 and the second spreader 12 are dependent on each other, it is obvious that, even when the rotation detection sensor 50 is provided on only one of the first spreader 11 and the second spreader, an operation of the other one of the first spreader 11 and the second spreader 12 can be calculated.

The object determination unit 62 may compare the real operation of the spreaders 11, 12 detected at the rotation detection sensor 50, and the estimated operation of the spreaders 11, 12 calculated at the simulation unit 61.

More specifically, the object determination unit 62 may compare an estimated rotation angle and a real rotation angle of the spreaders 11, 12. In addition, the object determination unit 62 may compare an estimated shift distance and a real shift distance of the spreaders 11, 12.

The object determination unit 63 may determine whether there exists the object K according to a result of comparing the real operation and the estimated operation of the spreaders 11, 12. In addition, the object determination unit 63 may determine a shape of the object K. This will be described in detail hereinbelow.

The object determination unit 63 may transmit a feedback signal to the controller 60. The controller 60 may reflect the feedback signal and may transmit a modified control command to the driving mechanism 30. Accordingly, the driving mechanism 30 may be feedback-controlled according to whether there exists the object K and the shape of the object K.

The hand of the robot may further include an output unit 63. The output unit 63 may transmit a notification related to an action of the hand of the robot to a user. For example, the output unit 63 may include at least one of a speaker and a display.

The output unit 63 may be controlled by the controller 60. The output unit 63 may output information regarding whether there exists the object K or the shape of the object K.

Figure 11:
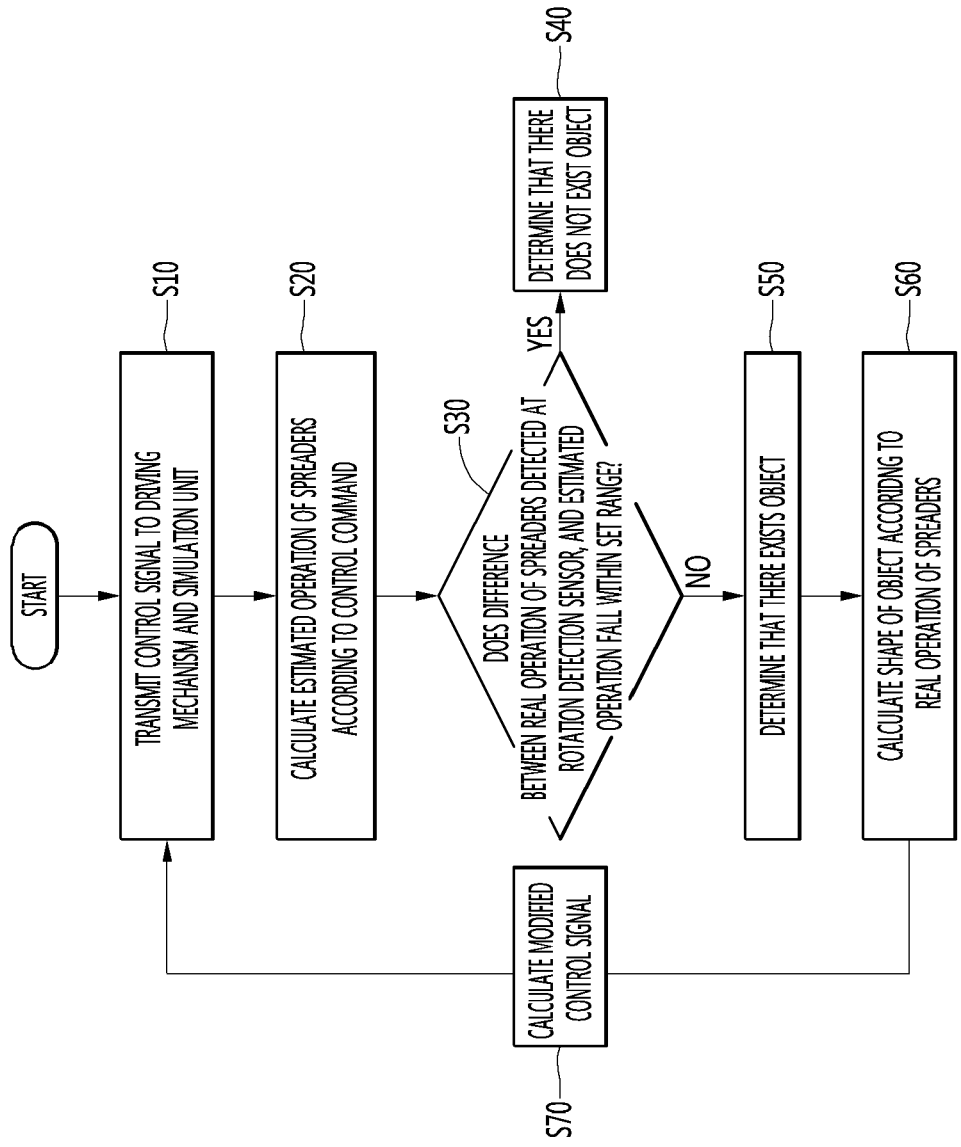
FIG. 11 is a flowchart illustrating a schematic sequence of a control method of a robot hand according to an embodiment of the present disclosure.

FIG. 11 is a flowchart illustrating a schematic sequence of a control method of the hand of the robot according to an embodiment of the present disclosure.

Hereinafter, the control method of the hand of the robot will be described in detail.

The controller 60 may transmit a control signal to the driving mechanism 30 and the simulation unit 61 (S10). For example, in the first embodiment (see FIG. 4), the control signal may include current information for rotating the first motor 31 and the second motor 32 at their respective set rotation angles.

The driving mechanism 30 may be driven according to the received control signal, and accordingly, the spreaders 11, 12 may operate and cause the fingers 29 to be bent.

The rotation detection sensor 50 may transmit real operation information of the spreaders 11, 12 to the object determination unit 62. The real operation information may include a rotation angle and/or a shift distance of the spreaders 11, 12.

The simulation unit 61 may calculate an estimated operation of the spreaders 11, 12 according to the received control signal (S20). The simulation unit 61 may transmit the estimated operation information to the object determination unit 62. The estimated operation information may include an estimated rotation angle and/or an estimated shift distance of the spreaders 11, 12.

The object determination unit 62 may determine whether a difference between the real operation of the spreaders 11, 12 detected at the rotation detection sensor 50 and the estimated operation of the spreaders 11, 12 transmitted from the simulation unit 61 falls within a predetermined set range (S30).

More specifically, the object determination unit 62 may determine whether a difference between the estimated rotation angle and the real rotation angle of the spreaders satisfies a first condition falling within a first set range. In addition, the object determination unit may determine whether a difference between the estimated shift distance and the real shift distance of the spreader satisfies a second condition falling within a second set range.

When both the first condition and the second condition are satisfied, the object determination unit 62 may determine that the difference between the real operation and the estimation operation of the spreaders 11, 12 falls within the set range. When neither of the first condition and the second condition is satisfied, the object determination unit 62 may determine that the difference between the real operation and the estimated operation of the spreaders 11, 12 falls out of the set range.

When the plurality of fingers 29 grip the object K, the object K may act as a resistance to the bending of the fingers 29. More specifically, when the same control signal is transmitted to the driving mechanism 30, and there exists the object K, the degree of bending of the fingers 29 may be smaller than when there does not exist the object K.

That is, when there exists the object K, the real operation of the spreaders 11, 12 may be smaller than the estimated operation, and when there does not exist object K, the real operation of the spreader 11, 12 may be the same as or similar to the estimated operation.

Accordingly, when the difference between the real operation and the estimated operation of the spreaders 11, 12 falls within the set range, the object determination unit 62 may determine that there does not exist the object K (S40). In this case, the object determination unit 62 may transmit information indicating that no object is detected to the controller 60. The controller 60 may transmit a command to output a notification that the object K is not detectable to the output unit 63, and the notification that the object K is not detectable may be outputted through the output unit 63. In addition, the object determination unit 62 may directly transmit, to the output unit 63, the command to output the notification that the object K is not detectable, without passing through the controller 60.

On the other hand, when the difference between the real operation and the estimated operation of the spreaders 11, 12 falls out of the set range, the object determination unit 62 may determine that there exists the object K (S50). In this case, the object determination unit 62 may calculate a shape of the object K according to the real operation of the spreaders 11, 12 detected at the rotation detection sensor 50 (S60).

For example, when the object K has a cylindrical shape having a uniform diameter, the resistance of the object K acting on each finger 29 may be uniform. Accordingly, the plurality of fingers 29 may be bent by the same degree, and the spreaders 11, 12 may not rotate and may be shifted.

That is, when the rotation detection sensor 50 detects that the spreaders 11, 12 do not rotate and are shifted, the object determination unit 62 may calculate that the object K has a cylindrical shape having a uniform diameter.

In another example, when the object has a conical shape having a diameter gradually decreasing toward one side, the resistance of the object K acting on each finger 29 may gradually decrease toward the one side. Accordingly, fingers positioned at the one side may be more bent, and the spreaders 11, 12 may rotate in one direction.

That is, when the rotation detection sensor 50 detects that the spreaders 11, 12 rotate in one direction, the object determination unit 62 may calculate the shape of the object K as a conical shape having a diameter gradually decreasing toward one side.

The controller 60 may receive information of the shape of the object K calculated at the object determination unit 62. The controller 60 may generate a modified control signal according to the shape information of the object K received, and may transmit the modified control signal to the driving mechanism 30 and the simulation unit 61 (S70), (S10). Accordingly, continuous feedback control of the driving mechanism 30 is possible.

When the driving mechanism 30 is driven according to the modified control signal, it is possible to reliably grip according to the shape of the object K. For example, when the shape of the object K calculated at the object determination unit 62 is a shape having a diameter gradually decreasing toward one side, the driving mechanism 30 driven according to the modified control signal may control the spreaders 11, 12 to cause fingers 29 positioned at the one side to be more bent.

According to preferred embodiments of the present disclosure, there is an advantage that all of the plurality of fingers can be controlled by a smaller number of motors than the number of fingers.

In addition, states and operations of all of the plurality of fingers can be detected by a smaller number of rotation detection sensors than the number of fingers.

In addition, feedback control may be performed by using a result of detecting by the rotation detection sensor, such that the hand of the robot can be precisely controlled.

In addition, a shape of a gripped object can be easily calculated based on a result of detecting by the rotation detection sensor.

In addition, the hand of the robot can be easily controlled with a simple configuration, and a manufacturing cost can be saved.

In addition, the driving wires, the stretching wires, and the bending wires can be kept taut, and the fingers can promptly react.

In addition, it can be determined whether there exists an object, by comparing a real operation of the spreaders detected at the rotation detection sensor, and an estimated operation.

In addition, a shape of an object can be calculated based on an operation of the spreaders, and feedback control can be performed according to the shape of the object. Accordingly, it is possible to reliably grip according to the shape of the object.

The technical concept of the present disclosure has been described by way of an example, and it will be understood by those skilled in the art that various modification and changes can be made without departing from the spirit and scope of the present disclosure.

Therefore, embodiments of the present disclosure are not intended to limit the technical concept of the present disclosure, and are just to describe the present disclosure, and the scope of the technical concept of the present disclosure is not limited by the embodiments.

The right scope of the present disclosure should be interpreted based on the appended claims, and all technical concepts within the scope equivalent thereto should be interpreted as being included in the right scope of the present disclosure.

What is claimed is:

1. A hand of a robot, comprising:
a hand main body comprising a palm;
a plurality of fingers connected to the hand main body;
a first spreader disposed inside the hand main body;
a second spreader positioned between the palm and the first spreader and disposed in parallel to the first spreader;
a plurality of stretching wires connected to any one of the first spreader and the second spreader, and configured to pull the fingers to cause the fingers to be stretched;
a plurality of bending wires connected the other one of the first spreader and the second spreader, and configured to pull the fingers to cause the fingers to be bent;
a driving mechanism configured to rotate and/or shift the first spreader and the second spreader; and
a rotation detection sensor provided on at least one of the first spreader or the second spreader,
wherein the driving mechanism comprises:
a first driving wire connected to a point that is eccentric to one side with respect to a longitudinal direction of one spreader of the first spreader and the second spreader;
a first motor configured to wind the first driving wire;
a second driving wire connected to a point that is eccentric to an other side with respect to the longitudinal direction of the one spreader;
a second motor configured to wind the second driving wire;

a third driving wire connected to a point that is eccentric to one side with respect to a longitudinal direction of the other spreader of the first spreader and the second spreader;
a third motor configured to wind the third driving wire;
a fourth driving wire connected to a point that is eccentric to an other side with respect to the longitudinal direction of the other spreader; and
a fourth motor configured to wind the fourth driving wire.

2. The hand of the robot of claim 1, wherein the rotation detection sensor is positioned at a middle point with respect to a longitudinal direction of the first spreader or the second spreader.

3. The hand of the robot of claim 1, wherein the first spreader and the second spreader are spaced apart from the palm.

4. The hand of the robot of claim 1, wherein some of the plurality of stretching wires are connected to a point that is eccentric to one side with respect to a longitudinal direction of the first spreader, and others are connected to a point that is eccentric to an other side.

5. The hand of the robot of claim 1, wherein some of the plurality of bending wires are connected to a point that is eccentric to one side with respect to a longitudinal direction of the second spreader, and others are connected to a point that is eccentric to an other side.

6. A hand of a robot, comprising:
a hand main body comprising a palm;
a plurality of fingers connected to the hand main body;
a first spreader disposed inside the hand main body;
a second spreader positioned between the palm and the first spreader and disposed in parallel to the first spreader;
a plurality of stretching wires connected to any one of the first spreader and the second spreader, and configured to pull the fingers to cause the fingers to be stretched;
a plurality of bending wires connected the other one of the first spreader and the second spreader, and configured to pull the fingers to cause the fingers to be bent;
a driving mechanism configured to rotate and/or shift the first spreader and the second spreader;
a rotation detection sensor provided on at least one of the first spreader or the second spreader;
a controller configured to control the driving mechanism;
a simulation unit configured to receive a control signal from the controller and to calculate an estimated operation of the first spreader and the second spreader; and
an object determination unit configured to, when a difference between the estimated operation and a real operation detected by the rotation detection sensor falls out of a set range, calculate a shape of a gripped object, and to transmit a feedback signal to the controller.

7. The hand of the robot of claim 6, further comprising an output unit configured to, when the difference between the estimated operation and the real operation falls within the set range, output a notification that the object is not detectable.

8. A control method of a hand of a robot which comprises a plurality of stretching wires connected to any one of one pair of spreader to cause a plurality of fingers to be stretched, and a plurality of bending wires connected to the other one of the one pair of spreaders to cause the plurality of fingers to be bent, the method comprising the steps of:
transmitting a control signal to a driving mechanism configured to rotate and/or shift the spreader;
calculating an estimated operation of the spreader which is estimated according to the control signal;
detecting, by a rotation detection sensor, a real operation of the spreader;
when a difference between the real operation and the estimated operation falls out of a set range, calculating a shape of an object gripped by the hand of the robot; and
feedback-controlling the driving mechanism according to the shape of the object.

9. The method of claim 8, further comprising a step of, when the difference between the real operation and the estimated operation falls within the set range, outputting a notification that the object is not detectable to an output unit.

* * * * *